United States Patent [19]

Barthels et al.

[11] 3,801,450
[45] Apr. 2, 1974

[54] NUCLEAR-FUEL ELEMENT

[75] Inventors: Heinz Barthels; Josef Fassbender; Werner Katscher, all of Julich, Germany

[73] Assignee: Kernforschungsanlage Julich Gesellschaft mit beschrankter Haftung, Julich, Germany

[22] Filed: Dec. 17, 1971

[21] Appl. No.: 209,301

[30] Foreign Application Priority Data
Dec. 24, 1970 Germany.............................. 2063876

[52] U.S. Cl.......................... 176/73, 176/82, 176/83
[51] Int. Cl............................................. G21c 3/16
[58] Field of Search........................... 176/73, 82, 83

[56] References Cited
UNITED STATES PATENTS

| | | | |
|---|---|---|---|
| 3,406,090 | 10/1968 | Dunn et al............................ | 176/73 |
| 3,179,572 | 4/1965 | Perilhou et al. ..................... | 176/73 |
| 3,047,487 | 7/1962 | Cannon................................ | 176/73 |

FOREIGN PATENTS OR APPLICATIONS

| | | | |
|---|---|---|---|
| 845,804 | 8/1960 | Great Britain ....................... | 176/73 |
| 946,901 | 1/1964 | Great Britain ....................... | 176/73 |
| 998,387 | 7/1965 | Great Britain ....................... | 176/73 |
| 1,464,740 | 9/1969 | Germany ............................. | 176/73 |

*Primary Examiner*—Reuben Epstein
*Attorney, Agent, or Firm*—Karl F. Ross; Herbert Dubno

[57] ABSTRACT

A fuel element for a nuclear reactor comprises a hollow structure forming a coolant path and one or more partitions intercepting the coolant flow between the inlet and the outlet, the partitions comprising perforated, aperture or porous supporting walls flanking a porous mass of coated nuclear-fuel particles.

11 Claims, 13 Drawing Figures

NUCLEAR-FUEL ELEMENT

FIELD OF THE INVENTION

Our present invention relates to a fuel element for a nuclear reactor and, more particularly, to a nuclear-fuel element for a reactor core using coated-particle fuels.

BACKGROUND OF THE INVENTION

Coated-particle nuclear fuels generally consist of a core of a fissionable material, e.g. plutonium, uranium or thorium oxides or other compounds, individually or in mixtures, encased in a ceramic-like sheath or coating designed to retain gaseous and solid fission products, to protect the fuel core and to allow heat exchange with the reactor coolant. The coated-particle fuel generally has a diameter between $10^2$ and $3 \times 10^3$ microns, the coating being pyrolytically deposited carbon, silicon carbide, or like refractory, high-strength materials. Coated particles intended for use with the present invention may be any of those described in the article entitled *Ceramic Coated-Particle Nuclear Fuels* by Dayton, Oxley and Townley, JOURNAL OF NUCLEAR MATERIALS, Volume 11, No.1, pages 1 – 31 (January 1964).

It has been proposed to use such coated-particle nuclear fuels directly in high-temperature gas-cooled nuclear reactors, to incorporate coated-particle nuclear fuels in metal casings or graphite bodies and to use coated particles in various other nuclear-fuel elements of conventional configuration. The fuel elements were elongated or spherical, tightly packed or highly porous and generally were constructed to allow the coolant to pass through the interior of the fuel element or through a packing of such fuel elements. When metal casings were employed, they generally were hollow to form a coolant channel through the center thereof.

While nuclear-fuel elements of the aforedescribed character were satisfactory for most purposes, they were only limitedly suitable for use in research reactors in which the presence of large radiation channels was desirable. Moreover, efficient heat exchange with particles of nuclear fuel in the interior of the fuel element could not always be guaranteed. Furthermore, it was often desirable to control the distribution of the coolant with respect to the character of the nuclear fuel to obtain a predetermined relationship, this being difficult, if not impossible, with bulk-fuel elements of the character described.

To overcome these disadvantages, it was proposed to provide the coated-particle nuclear fuel as a porous body with the coated particles bonded together or agglomerated to form a porous body. The gas or other reactor coolant could then be passed directly through this body. This system had the disadvantage that it was difficult to control gas distribution in relationship to the characteristics of the fuel particles and the further drawback that the body had insufficient mechanical stability and resistance to abrasion.

To improve the uniformity of interaction of a gaseous coolant and a nuclear fuel, it has been suggested to provide a nuclear fuel body as a layer of a thickness between 3 and 40 mm and to deflect the coolant stream through this layer by closing the central passage of a cylindrical or annular structure constituted of the nuclear-fuel material. The thickness of the layer was limited because of the high pressure drop and flow resistance imposed by the nuclear-fuel layer. Mechanical breakdown and rupture of the nuclear-fuel layer was, however, a significant danger since it tended to shut the coolant around the nuclear fuel and thereby allow overheating in regions of the reactor. Other arrangements using porous layers of nuclear-fuel particles have been characterized by the nonuniformity of distribution of the coolant, inefficient heat exchange between all of the nuclear fuel and the coolant, excessive pressure drop and fluid-flow resistance, the danger of coolant breakthrough and shunting, and difficulties with respect to the mechanical strength and ability to handle fuel elements containing the nuclear-fuel particles. It should also be noted that an important consideration in dealing with nuclear-fuel arrangements is the disability of a high spatial density of the nuclear fuel while permitting, at least in research reactors, radiation channels to exist into which a specimen to be radiated can be introduced.

OBJECTS OF THE INVENTION

It is the principal object of the present invention to provide an improved nuclear-fuel element which has a high yield, which affords uniform cooling, and coolant flow and which avoids the difficulties hitherto encountered with prior-art nuclear-fuel elements.

Another object of the invention is to provide a nuclear-fuel element with uniform and controllable distribution of a cooling fluid without the danger of coolant breakthrough or over-heating of the nuclear fuel.

It is also an object of our invention to provide a nuclear-fuel element particularly adapted for use in a research reactor and which avoids difficulties hitherto encountered with particulate nuclear fuels.

Still another object of the instant invention is the provision of an improved nuclear-fuel element with a long useful life.

SUMMARY OF THE INVENTION

These objects and others which will become apparent hereinafter according to the present invention, are obtained with a nuclear-fuel element for use in a nuclear reactor, e.g., a high-temperature gas-cooled nuclear reactor which comprises a housing, shell or casing defining a concurrent-flow passage having an inlet side for the coolant, and an outlet side, the passage being spanned by one or more partitions, each of which comprises a pair of fluid-permeable walls in spaced-apart relation and receiving a filling of coated particles of nuclear fuel. The term "nuclear-fuel element" as used herein, is thus intended to describe the structure containing the passage and one or more such partitions which is used to contain the nuclear fuel and is insertable into the nuclear-reactor core in a predetermined matrix or array so as to generate a neutron flux or to be irradiated thereby.

The arrangement of a loosely piled mass of coated nuclear-fuel particles has been found to have some significant advantages in the operation of the reactor. Firstly, the perforated walls flanking the mass may have a flow-passage cross-section controlled either by varying the number of orifices, or the cross-section of each orifice, or the thickness of the wall traversed by each orifice to control the throughflow resistance. Each of these parameters may, of course, be used in conjunction with any other parameters. The flow cross-section and resistance may thus be dependent on the packing of the fuel particles or may be used in conjunction with the packing to obtain the desired distribution of coolant vis-a-vis the nuclear fuel or to maintain a uniform flow through all portions of the partition.

According to an important feature of the invention, the supporting walls of each partition, flanking the mass of loosely piled coated nuclear-fuel particles, can comprise perforated plates, sieve members or wire fabric or mesh, or even plates of coherent nuclear-fuel particles of a predetermined porosity. In all of these cases, it is possible simply by adjusting the pore size, number of pores or distribution, or the thickness of the wall through which the coolant must pass, to restrict or increase the flow resistance to maintain the coolant flow proportional to the neutron flux of the fuel material. In other words, in regions in which the neutron flux of fission reactions is greater, the coolant flow may be increased and vice versa. When the walls are composed of coated particles or nuclear fuel bonded together, the porosity may be regulated by increasing the proportion of binder in certain areas to reduce the pore cross-section and vice versa.

According to a more specific feature of the invention, the inlet and outlet passages formed in the walls of each partition turned toward the inlet and outlet sides of the coolant duct, respectively, are designed to maintain the coolant velocity in the axial direction substantially constant. In this case, the duct may provide an axial inlet and an axial outlet for the coolant as well as inlet and outlet duct branches which parallel one another in the axial direction over at least a portion of the length of the fuel element but are separated by one or more partitions. Since the rate at which the coolant traverses the partition is a function of the flow cross-sections of the inlet and outlet passages of the walls forming the partition, and the pressure differential thereacross, we prefer to vary the flow direction at an acute angle defined by the half-angle of the conicity of the partition. The frustocone may converge or diverge in the flow direction and we prefer to provide a multiplicity of frustocones in alternately opposite convergence and in axial alignment within the interior of the fuel element. The apexes of the conical bodies preferably abut one another. While the cones may be defined by straight-line generatrices, we may make use of conical partitions whose generatrices are arcs, preferably corresponding to the arc of a sinusoid whereby the partition may have the configuration of a corrugated pipe.

According to another feature of the invention, the relationship between the thermal (and neutron flux) output and the coolant flow may be varied by adjusting the diameter and/or the nuclear-fuel content of the nuclear-fuel particles within the fuel element.

Furthermore, we have found it to be advantageous, especially when the mass of coating nuclear-fuel particles is disposed between more or less rigid walls to provide one or more layers of yieldable but fluid-permeable material, preferably of a substance having a low neutron-absorption cross-section, in contact with the body of coated particles. The layer may be provided between the body of coated particles and either or both permeable walls and one or more layers may be provided within the body of coated particles. The layer may be a mat, felt or fabric of graphite, silica or like fibers capable of resisting the high temperatures of the reactor and yielding to the thermally induced expansion and contraction of the body of nuclear-fuel particles. This prevents the particles from becoming damaged by movement against the walls, limits the formation of hollows within the mass of loosely packed nuclear-fuel particles, and otherwise reduces stress in the system.

It should be noted further that the present invention allows the thickness and/or porosity of the loosely piled layer of coated nuclear-fuel particles and/or the thickness and/or the porosity of the porous walls flanking the partition to be varied over the length of the fuel element to achieve uniform distribution of the coolant or a controlled distribution of the coolant in accordance with variations in reactor output.

Among the advantages of the fuel element according to the present invention is that it allows a substantial improvement in the heat transfer between the fuel and the coolant because the coolant in all cases passes transversely through the body of nuclear fuel particles in a distributor manner. In other words, all of the coolant passes through the partition at least once. The advantages of the controlled distribution of the coolant and an optimum adjustment of the coolant flow to the thermal output of the fuel element has also been discussed. Moreover, the fuel element of the present invention provides for increased safety since the construction of the fuel-particle body as a partition increases the availability of channels for emergency flow of coolant. It suffices, therefore, to introduce coolant at the outside of the nuclear fuel body to enable it to pass effectively over the remainder thereof. Of course, it is also possible to spray the coolant from the inside out, or from the exterior transversely to the surface to obtain a satisfactory coolant and for this reason the fuel elements contemplated in accordance with the present invention can be used effectively in water-cooled nuclear reactors. This arrangement has the further advantage that, upon failure of the primary coolant flow, the fuel element remains surrounded by the secondary coolant.

Still another advantage of the fuel element according to the present invention resides in the fact that the nuclear-fuel body formed by the partition can be held to a thickness of one to several millimeters, so that additional space is provided, aside from the coolant channels, which may be used in a research reactor for central radiation channels and the like.

DESCRIPTION OF THE DRAWING

The above and other objects, features and advantages of the present invention will become more readily apparent from the following description, reference being made to the accompanying drawing in which.

SPECIFIC DESCRIPTION

Figure 1:
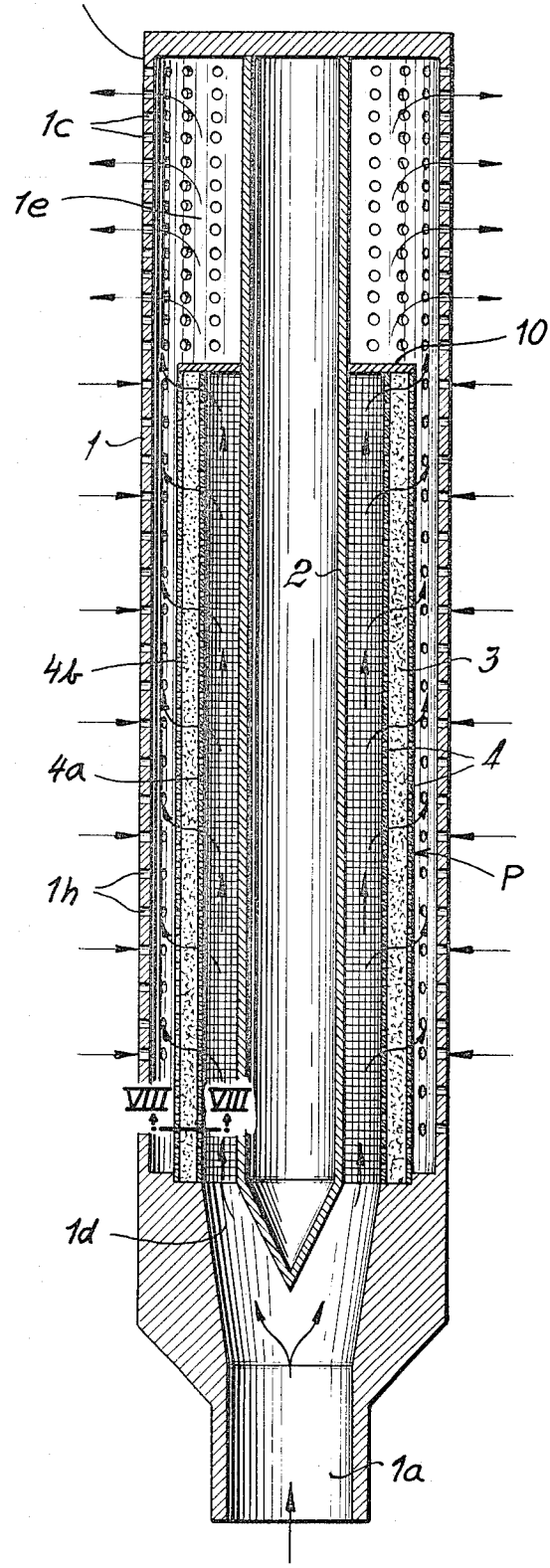
FIG. 1 is an axial cross-sectional view, partly in diagrammatic form, of an annular nuclear-fuel element according to the invention.

In FIG. 1, we have shown a nuclear fuel element which comprises an outer cylindrical casing 1 and an inner cylindrcial casing 2 coaxial therewith. The casing 1 defines an axial inlet 1a for a coolant fluid and is perforated at its upper end 1b at 1c to define outlet passages for the coolant. To either side of the body of the nuclear fuel element, therefore, there is provided an axial inlet region 1d and an axial outlet region 1e which may be traversed by the coolant. The annular duct formed by the body of the fuel element, between the passages 1d and 1e is partitioned at P by an annular partition consisting of, in its basic construction, a loose filling 3 of coated-particle nuclear fuel and a pair of perforated walls 4 retaining the filling in place. Instead of a loose filling of free particles, the particles may be held in a matrix or binder, e.g., of silica gel or other refractory material as long as the porosity of the filling is maintained. The walls 4 are provided with apertures 4a forming inlet passages, and apertures 4b forming outlet passages for the coolant. At its upper end, the tube formed by the filling 3 and walls 4 is closed by a ring 10 to ensure that all of the fluid entering the tube traverses the partition generally radially, as represented by the arrows.

Because of the large total throughflow cross-section of the partition, the overall pressure drop is minimized and becuase of the large overall surface area of the nuclear fuel mass the heat transfer rate is increased.

Because of the fact that the coated particles have a diameter in general below about 2 mm, the high ratio of heat transfer surface area to volume provides a high specific volume of nuclear fuel for a given rate of heat transfer and volume of the fuel element. It is, of course, possible to eliminate the outer casing 1 completely in the event the coolant is to be discharged into the space surrounding the fuel element. Furthermore, openings may be provided at 1h through which a coolant may be introduced when the port 1a is to constitute an outlet. In this case, the coolant will traverse the partition in the opposite direction.

Figure 8:
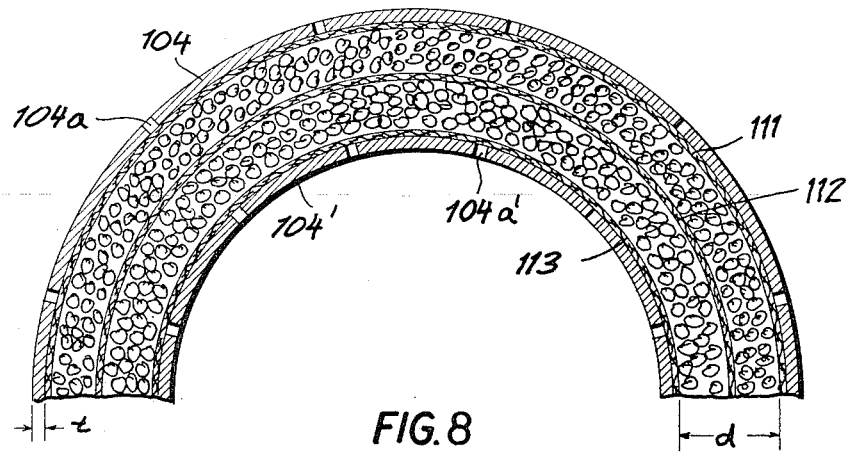
FIG. 8 is a cross-sectional view taken generally along the line VIII — VIII of FIG. 1 and drawn to an enlarged scale.
Figure 9:
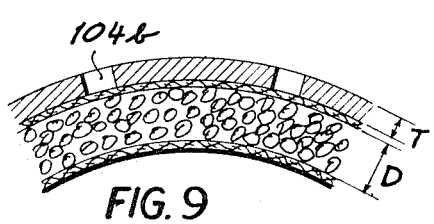
FIG. 9 is a detail view of a portion of the partition of FIG. 1 but illustrating a region further along the fuel element.

Referring now to FIGS. 8 and 9, it will be seen that the outer wall 104 and the inner wall 104' may have apertures 104a and 104a' of a certain cross-sectional area and spacing which may differ from the spacing of the apertures 104b of the wall portion at another location along the length of the fuel element. Consequently, the rate of flow of the coolant across the partition can be adjusted in accordance with the heat generated in the particular region of the partition or in accordance with the pressure drop to main a substantially constant axially flow velocity throughout the fuel element as illustrated in FIG. 1. Furthermore, the thickness $t$ of the rigid wall may be different at one location from the thickness T at another location (compare FIGS. 8 and 9) so that the flow rate is controlled by the length of the passage 104a or 104b as previously described. Furthermore, the flow rate can be controlled by the packing density of the coated particles between the rigid walls and thus FIG. 9 shows a less dense packing than is shown in FIG. 8.

According to the invention, moreover, layers 111, 112 and 113 of a refractory fluid-permeable material, e.g., graphite fibers in felt or fabric form, may be provided between the layer of coated particles and the respective walls or within the layer of coated particles to take up variations in dimensions resulting from temperature changes. In all cases, the cushion lyaers should be composed of a material having a low absorption cross section for a neutron flux. The thickness D of the particle layer may also differ from the thickness $d$ at another location along the length of the fuel element in order to coordinate the coolant flow rate to the output of the fusionable fuel.

Figure 12:
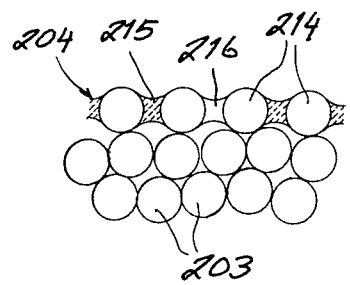
Figure 10:
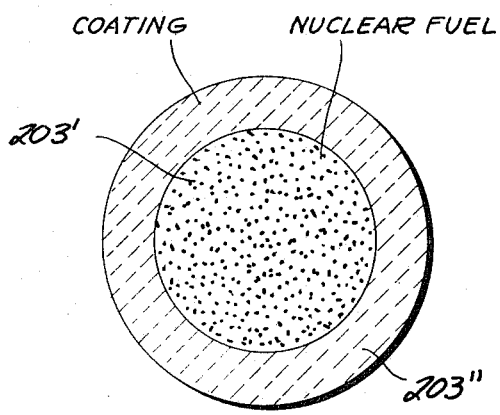
FIG. 10 is a cross-sectional view through a nuclear fuel particle according to the present invention at one portion of the partition.
Figure 11:
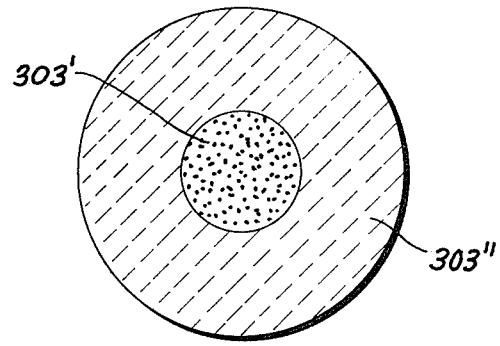
FIG. 11 is a cross-sectional view through the nuclear fuel partition at another portion of the partition.

In FIG. 12, we have shown an arrangement in which the outer walls of the partition are formed by a layer 204 of coated particles 214 held together by a binder 215, the distribution of pores 216 and the mean pore size being controlled by the proportion of binder mixed with the particles. As in the embodiment of FIGS. 8 and 9, the walls 204 contain a loose or bound pile of coated particles 203. In all of the embodiments described, the proportion of nuclear fuel which is present may be increased by increasing the diameter of the core 203' which is composed of uranium, plutonium or thorium compounds. The ceramic coating is represented at 203'' in FIG. 10 and in FIG. 11, we show a similar coated particle in which the core 303' has a smaller diameter but is surrounded by a thicker coating 303''.

Figure 2:
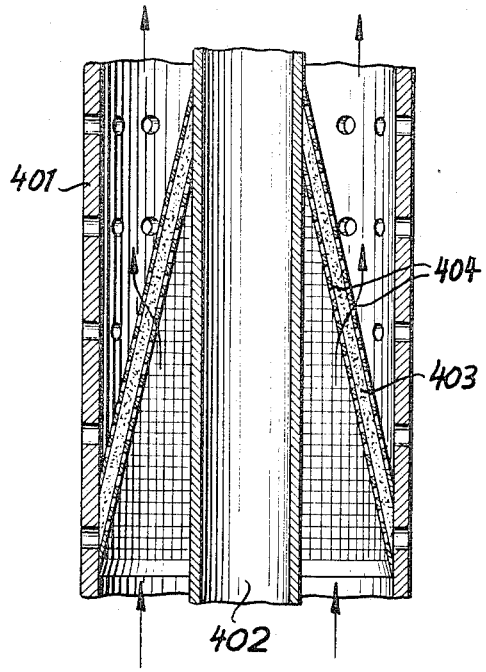
FIGS. 2 and 3 are cross-sectional views of annular fuel elements according to the invention, wherein the parition has a conical configuration, only one side of the axially symmetrical fuel element being shown in each case.
Figure 3:
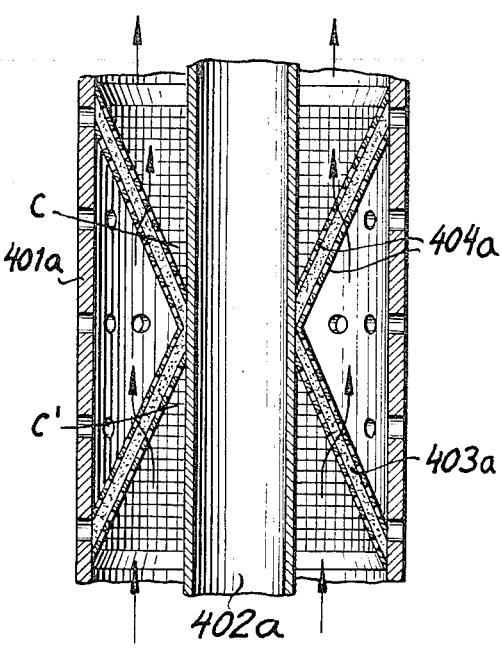
Figure 4:
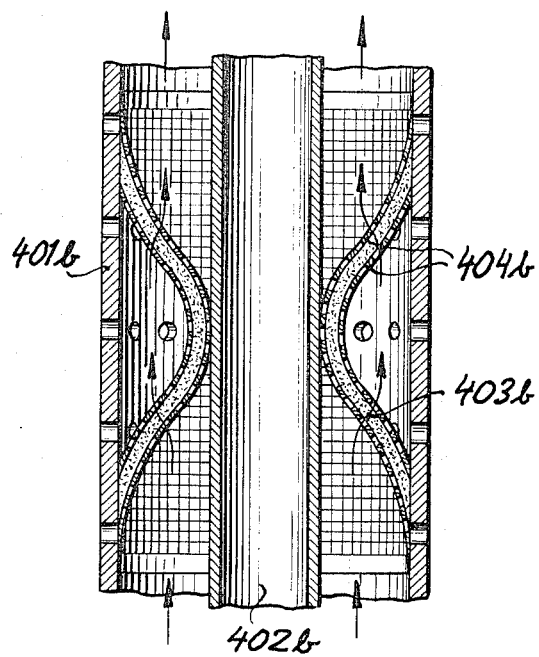
FIG. 4 is a cross-sectional view showing one side of the annular nuclear fuel element provided with a corrugated-tube partition in which the cross-section corresponds generally to a sinusoid.

In FIGS. 2 – 4, we show various sytems embodying the invention and in which the axial flow of the fluid into and out of the element is represented by the arrows. In FIGS. 2 –4, the inner shell is represented at 402, 402a and 402b while the outer shell is constituted at 401, 401a and 401b, the outer shell being formed with inlets and outlets as described in connection with FIG. 1. Between the shells and in the angular gap defined thereby, there is provided the fuel partitions 403, 403a and 403b, respectively constituted by layers of coated particles received between pairs of apertured walls 404, 404a and 404b. The partition 403, 404 of FIG. 2 is simply a frustocone diverging in the direction of the outlet and positioned so that the passage through the plates 404 open perpendicularly to the layer 403 and are offset from one another to cause the coolant to meander through the fuel layer.

In the system of FIG. 3, two frustocones are provided at C and C' with their broad bases in contact so that in approximately the same axial distance in which the gases in FIG. 2 traverse one partition, the coolant of FIG. 3 must traverse two partitions. In the system of FIG. 4, the partition 403b, 404b is constituted by a corrugated tube formed by the walls 404b and packed at 403b with the coated-particle nuclear fuel. The troughs of the corrugated tube hug the inner casing 402b while the crests are, in turn, tangent to the outer casing 401b.

Figure 5:
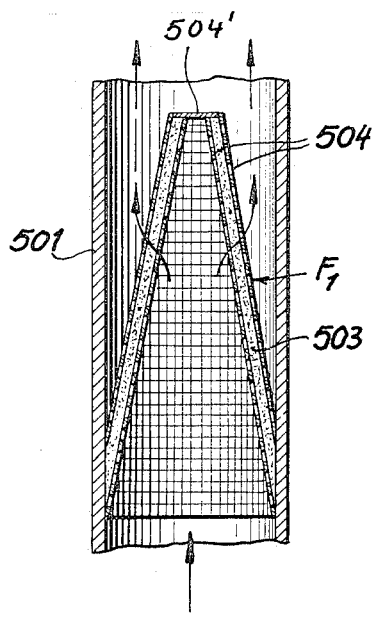
FIGS. 5 – 7 are axially cross-sectional views through tubular fuel elements according to the present invention, showing other configurations of the generally conical partition.
Figure 6:
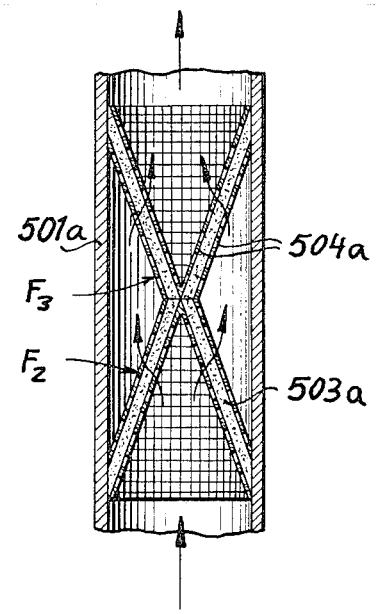
Figure 7:
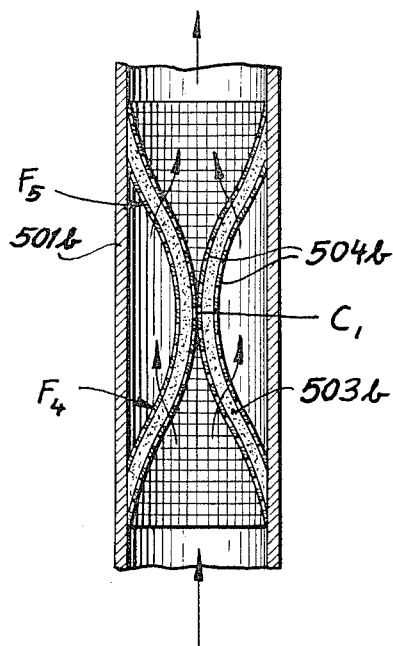

FIGS. 5 – 7 show embodiments of the present invention wherein a single tubular casing 501, 501a or 501b is provided with an inlet passage at the lower end and an outlet passage at the upper end. With each case, there is provided at least one partition of generally frustonical configuration and preferably a succession of such partitions. For example, in FIG. 5, a single frustocone $F_1$ is provided with a convergency in the direction of flow of the fluid. The cone consists of a pair of frustoconical walls 504 which are apertured at the coolant and a packing 503 of the coated-particle nuclear fuel. A plate can be provided at 504' to close the end of the cone. In the system of FIG. 6, the frustocones $F_2$ and $F_3$ are provided with their apexes in axial abutment and their bases hugging the wall of the casing 501a. Each cone comprises a pair of perforated walls 504a receiving the coated particles 503a between them. A similar structure is provided in FIG. 7 wherein the frustocones $F_4$ and $F_5$ have arcuate generatrices and are defined by a tube of generally sinusoidal axial cross section with a constriction at the center $C_1$.

Figure 13:
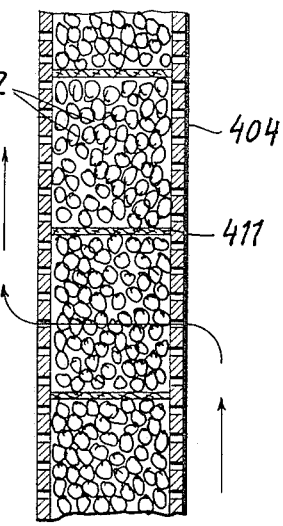
FIGS. 12 and 13 are diagrammatic cross-sectional views through other partition structures embodying the present invention.

In FIG. 13, we show an arrangement wherein the particles are received in perforated tubes 404 and are separated as zones 412 by layers, mats or webs of graphitized fibers 411.

We claim:

1. A fuel element for a nuclear reactor comprising a casing defining an inlet duct, an outlet duct and a passage between said ducts; and a coolant-permeable partition spanning said passage, said partition including a pair of fluid-permeable support walls defining a space of substantially constant thickness between them, and a fluid-permeable layer of substantially constant thickness of coated-particle nuclear fuel between said walls and filling said space, said partition being generally rotationally symmetrical about an axis and converging toward said axis in the direction of flow of a coolant therethrough, the porosity of said walls and said layer being dimensioned to maintain a substantially constant velocity of the coolant in the axial direction, said partition diverging in the direction opposite said direction of flow and terminating at said casing.

2. The fuel element defined in claim 1 wherein said partition is generally conical.

3. The fuel element defined in claim 2 wherein said partition consists of a plurality of cones having apexes in axial alignment and in substantial contact.

4. The fuel element defined in claim 1 wherein said partition has the configuration of a corrugated tube.

5. The fuel element defined in claim 1 wherein the diameter of the coated particles in one portion of the element differs from the diameter of coated particles in another portion thereof.

6. The fuel element defined in claim 1 wherein the nuclear-fuel content of the particles in one portion of the element differs from the nuclear-fuel content of the particles in another portion thereof.

7. The fuel element defined in claim 1 wherein said walls are substantially rigid, further comprising at least one layer of a refractory fluid-permeable flexible material of low-neutron absorption cross section in contact with said layer of said particles for absorbing expansion and contraction thereof.

8. The fuel element defined in claim 7 wherein said layer of low neutron absorption cross section is disposed within said layer of particles.

9. The fuel element defined in claim 6 wherein said layer of low neutron absorption cross section is disposed between said layer of particles and one of said walls.

10. The fuel element defined in claim 1 wherein the thickness and/or porosity of said layer and/or the thickness and/or the porosity of said walls is varied over the length of the fuel element for controlled distribution of a coolant therealone.

11. The fuel element defined in claim 1 wherein said layer is a mat felt or fabric of graphite, silica or like fibers capable or resisting the high temperatures of the reactor and yielding to the thermally induced expansion and contraction of the nuclear fuel.

* * * * *